(No Model.)
P. KREMERS.
COOKING UTENSIL.
No. 438,849. Patented Oct. 21, 1890.
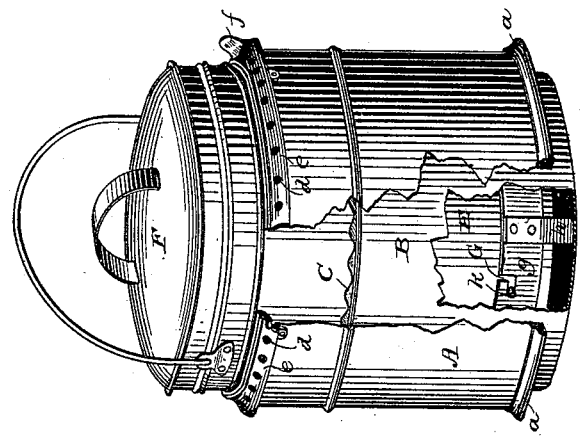
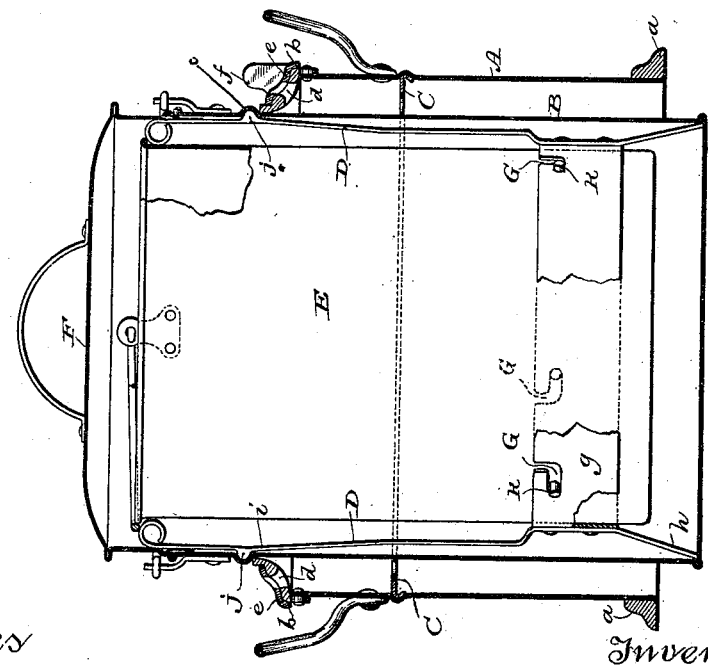
Witnesses
Geo. W. Young,
N. E. Oliphant
Inventor
Peter Kremers
By Stout & Underwood
Attorneys.

UNITED STATES PATENT OFFICE.

PETER KREMERS, OF MILWAUKEE, WISCONSIN.

COOKING UTENSIL.

SPECIFICATION forming part of Letters Patent No. 438,849, dated October 21, 1890.

Application filed April 6, 1888. Serial No. 269,867. (No model.)

*To all whom it may concern:*

Be it known that I, PETER KREMERS, of Milwaukee, in the county of Milwaukee, and in the State of Wisconsin, have invented certain new and useful Improvements in Cooking Utensils; and I do hereby declare that the following is a full, clear, and exact description thereof.

My invention relates to cooking utensils; and the invention consists in certain peculiar and novel features of construction and arrangement, as hereinafter described, and pointed out in the appended claim.

In order that my invention may be fully understood, I will proceed to describe it with reference to the accompanying drawings, in which—

Figure 1 is a transverse vertical section of my improved cooking utensil. Fig. 2 is a side elevation of the same, partly broken away to more clearly show the internal construction.

Referring to the drawings, A designates the outer vessel or drum, which is of cylindrical form, and the lower edge of which is formed with an external flange $a$. This outer vessel has no bottom, and its upper end is formed or provided with an inwardly and upwardly extending flange $b$, which is formed with a number of holes or perforations $d$. A ring $e$, having also a similar series of perforations, rests upon the flange $b$ and is provided with a lug or finger-piece $f$, the arrangement being such that by turning the ring $e$ the holes $d$ in the flange $b$ are either wholly or partially closed or opened.

B designates the intermediate vessel, the upper part of which is formed with an annular serrated concavo-convex offset $c$, which rests upon the upper edge of the outer vessel A, and thus supports the intermediate vessel within the outer vessel A. This intermediate vessel is provided with a cover F, and is of greater length or height than the outer vessel, so that its top extends upward beyond the upper end of the outer vessel, while its lower end or bottom projects downward through the lower end of said outer vessel, as shown. Within this intermediate vessel are secured a number of spring-arms D, the upper parts of which are formed with offsets $j$, which rest in the concave sides of the offset $c$. The lower ends of these spring-arms rest upon the bottom of the intermediate vessel B, and constitute supporting-legs $h$, and these legs are attached to a horizontal ring $g$, which has at its upper edge bayonet-slots G, to receive studs K, which project from the lower parts of the sides of the inner vessel E. The upper end of this inner vessel is supported by the upper ends of the spring-arms D, and its bottom does not reach as far downward as the bottom of the vessel B.

The vessel B is preferably provided with a bail or handle, and the outer sides of the outer vessel A are also preferably provided with suitable handles, as shown.

Water is to be placed in the intermediate vessel B, and the food to be cooked is to be placed in the inner vessel, while the entire utensil is designed to be set over a suitable lamp, the products of combustion escaping more or less freely through the holes in $b$ and $e$ above described.

It will thus be seen that I have produced a neat, compact, and effective utensil in which food can be cooked without any possibility of burning.

Having thus described my invention, what I claim as new therein, and desire to secure by Letters Patent, is—

The outer casing or drum, in combination with an intermediate vessel having an offset for supporting it within the drum, a ring supported within the intermediate vessel by spring arms and legs and having bayonet-slots, and an inner vessel having studs to enter said slots and to support the inner vessel within the ring, substantially as described.

In testimony that I claim the foregoing I have hereunto set my hand, at Milwaukee, in the county of Milwaukee and State of Wisconsin, in the presence of two witnesses.

PETER KREMERS.

Witnesses:
S. S. STOUT,
H. G. UNDERWOOD.